(12) United States Patent
Bender

(10) Patent No.: US 6,515,425 B1
(45) Date of Patent: Feb. 4, 2003

(54) HEADLIGHT ANTI-GLARE SYSTEM

(75) Inventor: Burnell L. Bender, Woodburn, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/604,991

(22) Filed: Jun. 28, 2000

(51) Int. Cl.[7] .............................. B60Q 1/02; B60Q 1/04
(52) U.S. Cl. ......................... 315/82; 315/77; 307/10.8
(58) Field of Search ............................. 315/82, 83, 80, 315/77, 90, 84; 362/61, 80, 802; 307/10.8, 10.1, 29, 42; 340/469, 468

(56) References Cited

U.S. PATENT DOCUMENTS

| 4,949,012 | A | * | 8/1990 | Irick et al. ................. 315/191 |
|---|---|---|---|---|
| 5,030,884 | A | * | 7/1991 | Roussey et al. ........... 307/10.8 |
| 5,075,593 | A | * | 12/1991 | Shoda .......................... 315/82 |
| 5,081,565 | A | * | 1/1992 | Nabha et al. ................. 362/61 |
| 5,614,788 | A | * | 3/1997 | Mullins et al. ............. 307/10.8 |
| 5,646,485 | A | * | 7/1997 | Simmon et al. .............. 315/82 |
| 5,780,974 | A | * | 7/1998 | Pabla et al. ................... 315/82 |

* cited by examiner

Primary Examiner—Don Wong
Assistant Examiner—Chuc Tran
(74) Attorney, Agent, or Firm—Jeffrey P. Calfa; Neil T. Powell; Dennis Kelly Sullivan

(57) ABSTRACT

An anti-glare system for motor vehicle headlights is effective to illuminate the headlights at reduced intensity when the vehicle is not in motion and the headlight switch is on thereby promoting better visibility for the driver of an oncoming vehicle. This system is believed particularly useful in service vehicles, such as pick-up and delivery trucks and school buses.

24 Claims, 2 Drawing Sheets

HEADLIGHT ANTI-GLARE SYSTEM

FIELD OF THE INVENTION

This invention relates generally to motor vehicle exterior lighting, and more particularly to an anti-glare system for vehicle headlights.

BACKGROUND AND SUMMARY OF THE INVENTION

Certain service vehicles, such as school buses, delivery trucks, and waste disposal trucks for example, may at times operate during non-daylight hours. During non-daylight operation, turning the headlight switch on illuminates the headlights, and other exterior lighting such as taillights, marker lights, cab clearance lights, etc. The headlights may operate on either high-beam or low-beam, depending on the position of a headlight dimmer switch. Headlights that are operating on low-beam may be momentarily switched to high-beam by another switch, sometimes called a flash-to-pass switch. Both dimmer switch and flash-to-pass switch may be disposed in association with a mechanism that operates turn signal/hazard warning switches. That mechanism comprises a steering column mounted lever that possesses actuating features distinct from turn and hazard actuating features to thereby provide independent actuation of the dimmer switch and the flash-to-pass switch.

A vehicle may also have a daytime running light circuit that automatically operates the headlights at reduced intensity for daytime running whenever the vehicle is operating and the headlight switch is off. The voltage that is applied to each of the headlight filaments during daytime running is less than their nominally rated operating voltage, causing the headlights to illuminate at less than full nominally rated intensity. There are various daytime running light circuits that can provide such reduced illumination intensity.

When a vehicle, such as a school bus, is operating during non-daylight conditions and/or in foggy weather with its headlights on, and the vehicle stops to pick up or discharge students, headlight glare from the school bus may impair some portion of an oncoming driver's field of view of the bus. The present invention relates to a novel anti-glare system for attenuating headlight glare during such conditions. It is believed that this can provide better visibility for the driver of the oncoming vehicle.

One aspect of the present invention relates to a motor vehicle headlight circuit or headlight module or circuit that is energized from a voltage source and comprises at least one headlight providing illumination of a field of view frontally of the vehicle, a headlight switch that is selectively operable to OFF and ON positions for selectively turning the at least one headlight off and on, and a main headlight circuit controlled by the headlight switch for operating the at least one headlight substantially at nominally rated operating voltage when the headlight switch is operated to ON position to illuminate the field of view at nominal illumination intensity. A reduced illumination intensity circuit can operate the at least one headlight at less than nominally rated operating voltage to illuminate the field of view at less than nominal illumination intensity when the headlight switch is in OFF position. A signal source is selectively operable to give a first signal for causing interruption of the main headlight circuit and the at least one headlight to operate at less than nominally rated operating voltage, and to give a second signal for causing no interruption of the main headlight circuit so that operation of the headlight switch to ON position is effective to operate the at least one headlight at nominally rated operating voltage.

Another aspect of the present invention relates to a motor vehicle comprising a voltage source, at least one headlight providing illumination of a field of view frontally of the vehicle, and a headlight control that is selectively operable to OFF and ON positions for selectively turning the at least one headlight off and on. A main headlight circuit is controlled by the headlight switch for causing substantially full voltage of the voltage source to be applied to the at least one headlight when the headlight control is operated to ON position to illuminate the field of view at a relatively full illumination intensity. A reduced illumination intensity circuit can cause substantially less than full voltage of the voltage source to be applied to the at least one headlight so that the field of view is illuminated at substantially less than relatively full illumination intensity when the headlight switch is in OFF position. A signal source is selectively operable to give a first signal that causes interruption of the main headlight circuit and substantially less than full voltage of the voltage source to be applied to the at least one headlight, and to give a second signal that causes no interruption of the main headlight circuit so that operation of the headlight switch to ON position is effective to cause substantially full voltage of the voltage source to be applied to the at least one headlight.

Still another aspect of the present invention relates to a motor vehicle comprising a voltage source, at least one headlight providing illumination of a field of view frontally of the vehicle, and a headlight control that is selectively operable to OFF and ON positions for selectively turning the at least one headlight off and on. A main headlight circuit is controlled by the headlight control for causing substantially full voltage of the voltage source to be applied to the at least one headlight when the headlight control is operated to ON position to illuminate the field of view at a relatively full illumination intensity. When the vehicle is not in motion and the headlight control is in ON position, a signal source gives a first signal for overriding the main headlight circuit by causing substantially less than full voltage of the voltage source to be applied to the at least one headlight so that the field of view is illuminated at substantially less than relatively full illumination intensity.

The foregoing, along with further features and advantages of the invention, will be seen in the following description and claims comprising disclosure of a presently preferred embodiment of the invention and depicting the best mode contemplated at this time for carrying out the invention. The disclosure includes drawings, as now briefly described.

DESCRIPTION OF THE PREFERRED EMBODIMENT

Figure 1:
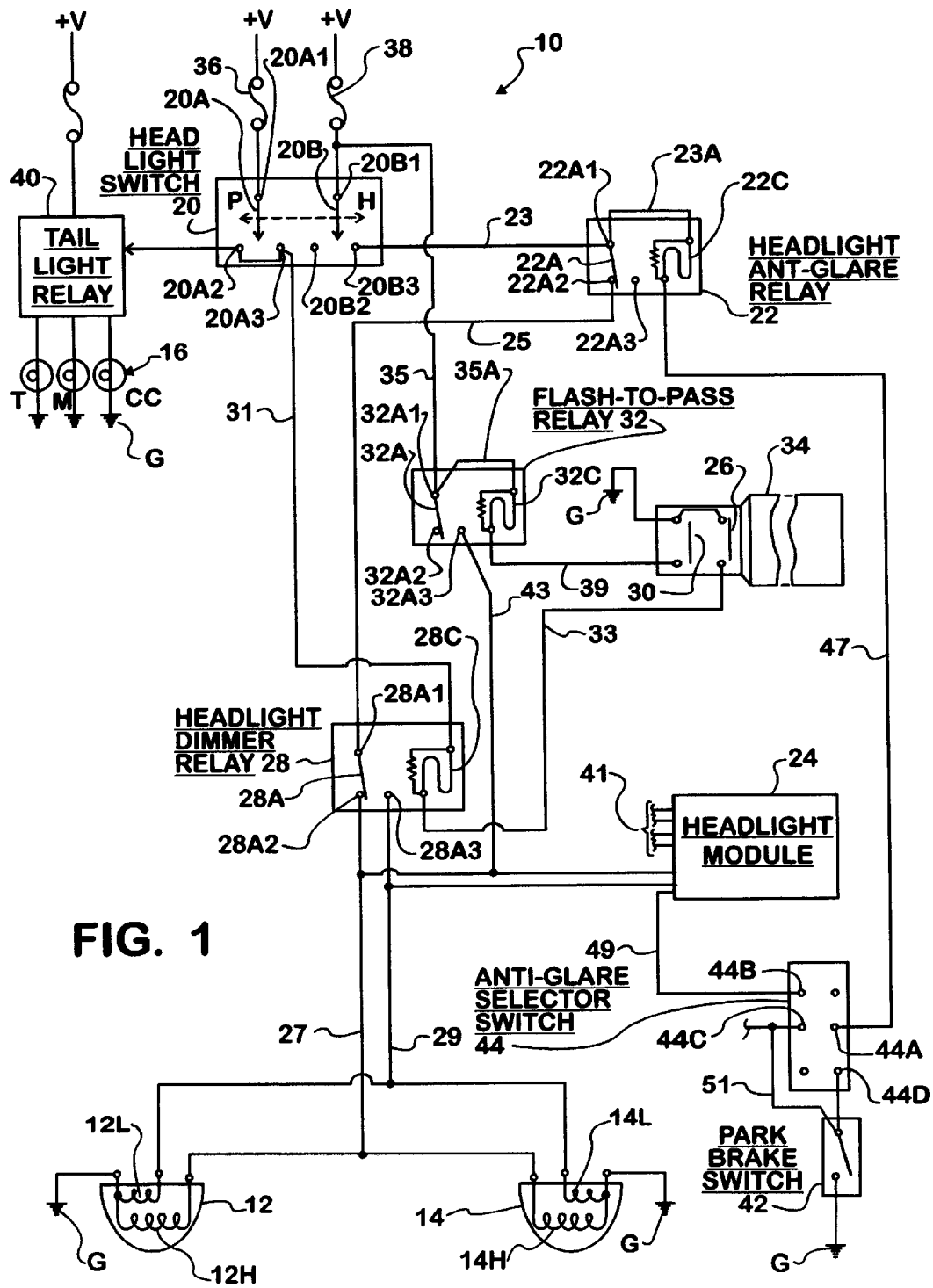
FIG. 1 is an electrical schematic diagram of a first embodiment of exterior lighting circuit of a motor vehicle that includes an anti-glare system for vehicle headlights according to principles of the present invention.

FIG. 1 shows a first embodiment of an exterior lighting circuit 10 of a motor vehicle. The vehicle has right and left headlights 12 and 14 respectively, each of which is shown by example as a dual filament device having a respective high beam filament 12H, 14H, and a respective low beam filament 12L, 14L. One side of each filament is connected to ground G. The vehicle also has certain other exterior lights designated by the general reference numeral 16. Examples of such lights are as tail lights, marker lights, and cab clearance lights.

Circuit 10 further comprises a headlight switch 20, a headlight anti-glare relay 22, a headlight module 24, a headlight dimmer switch 26, a headlight dimmer relay 28, a flash-to-pass switch 30, and a flash-to-pass relay 32. Dimmer switch 26 and flash-to-pass switch 30 are disposed in association with a steering-column-mounted turn signal lever 34 that possesses actuating features distinct from turn and hazard actuating features so as to provide independent actuation of each switch 26, 30. Headlight dimmer relay 28 is sometimes called a lift-to-dim relay because of the manner in which lever 34 is operated to dim headlights 12, 14.

The vehicle has an electrical power supply comprising a source of D.C. potential +V relative to ground G. What is commonly referred to as a 12 volt D.C. system is an example. The various light filaments may be rated for nominal voltage operation, perhaps 12.8 volts for example, that provides nominal full illumination intensity. The source of D.C. potential +V may be regulated to perhaps a slightly higher, yet still substantially equal voltages. In practice, the actual operating voltage across a lamp filament may differ to a small degree from its nominal operating voltage. It is to be understood that principles of the invention may be practiced in any electrical system other than a nominal +12 volt D.C. system.

Headlight switch 20 comprises two movable contacts 20A, 20B. Each movable contact is connected via a respective first terminal 20A1, 20B1 to the source of D.C. potential +V. In this example, each is connected through a respective circuit protection device 36, 38, such as a fuse. Two other terminals are associated with each contact. Terminals 20A2, 20A3 are associated with contact 20A, and terminals 20B2, 20B3, with contact 20B, although terminal 20B2 is not connected in the example of the schematic while terminals 20A2 and 20A3 are connected in common. In the OFF position of switch 20, which is the position illustrated in FIG. 1, neither contact 20A, 20B is making contact with the respective other two associated terminals 20A2, 20A3 and 20B2, 20B3.

Switch 20 can be operated from OFF position to select either PARK position P or HEADLIGHT position H. When PARK position P is selected, contact 20A completes a circuit from terminal 20A1 to commonly connected terminals 20A2, 20A3. This operates a taillight relay 40, causing lights 16 to illuminate. In HEADLIGHT position H, contact 20A completes a circuit from terminal 20A1 to commonly connected terminals 20A2, 20A3 to operate lights 16 via relay 40, and contact 20B completes a circuit from terminal 20B1 to terminal 20B3.

Each of relays 22, 28, and 32 comprises a respective coil 22C, 28C, 32C, a respective movable contact 22A, 28A, 32A that is operated by the respective relay coil. A terminal 22A1 to which movable contact 22A is connected and one of the two terminals of coil 22C are connected in common by a circuit 23A, and they are further connected by a conductor 23 to terminal 20B3 of switch 20. Another terminal 22A2 that is associated with contact 22A is connected by a conductor 25 to a terminal 28A1 of relay 28.

Movable contact 28A is connected to terminal 28A1, and relay 28 comprises two more terminals 28A2, 28A3 that are associated with movable contact 28A. Terminal 28A2 is connected to high-beam filaments 12H, 14H by a conductor 27; terminal 28A3, by a conductor 29 to low-beam filaments 12L, 14L. One terminal of coil 28C is connected in common with terminals 20A2, 20A3 of headlight switch 20 via a conductor 31. A conductor 33 connects the other terminal of coil 28C through dimmer switch 26 to ground G. When coil 28C is not energized, contact 28A completes a circuit from terminal 28A1 to terminal 28A2. When coil 28C is energized, contact 28A completes a circuit from terminal 28A1 to terminal 28A3.

Movable contact 32A of flash-to-pass relay 32 is connected to a terminal 32A1 and two more terminals 32A2, 32A3 that are associated with movable contact 32A. Terminal 32A1 and one terminal of coil 32C are connected in common by a conductor 35A and via a conductor 35 through fuse 38 to +V potential. The other terminal of coil 32C is connected by a conductor 39 through flash-to-pass switch 30 to ground G. Terminal 32A2 is not connected. Terminal 32A3 is connected to high-beam filaments 12H, 14H by a conductor 43. When coil 32C is not energized, contact 32A assumes the position indicated in the schematic. When coil 32C is energized, contact 32A operates from that position to complete a circuit from terminal 32A1 to terminal 32A3.

Headlight module 24 may comprise a daytime running light (DRL) module that automatically operates headlights at reduced intensity for daytime running whenever the vehicle is operating and headlight switch 20 is in OFF position. In the particular schematic of FIG. 1, module 24 is a DRL module presently used in vehicles manufactured and sold by the assignee of this invention. Additional conductors, 41 generally, connect various other terminals of module 24 with the vehicle power supply and with other electric devices, including the usual vehicle ignition switch and a park brake switch 42. For purposes of explanation, park brake switch 42 may be considered actuated when the vehicle parking brake is applied, and not actuated when the parking brake is not applied.

Also associated with headlight anti-glare relay 22 and headlight module 24, in the particular example represented by the illustrated schematic, is an anti-glare feature selector switch 44. A conductor 47 connects one terminal 44A of switch 44 and coil 22C of relay 22. A conductor 49 connects another terminal 44B and a terminal of module 24. A conductor 51 connects the ungrounded terminal of park brake switch 42 and two terminals 44C, 44D of switch 44 in common. Switch 44 is a two-position switch that allows the anti-glare feature to be cut out when desired. When switch 44 is in a first position, it cuts out the anti-glare feature, and when in a second position, it does not cut-out the anti-glare feature.

FIG. 1 shows a condition where none of coils 22C, 28C, 32C is being energized. The movable contacts 22A, 28A, and 32A are making contact with the respective terminals 22A2, 28A2, and 32A2, as shown, but not with the respective terminals 22A3, 28A3, 32A3.

FIG. 1 further shows headlight switch 20 in OFF position. When operated to ON position, switch 20 will energize coil 28C when dimmer switch 26 is selecting low-beam, causing low-beam illumination of headlights 12, 14. As long as the headlight switch remains ON, dimmer switch 26 is effective to switch the headlights between high-beam and low-beam operation. Whenever headlight switch 20 is ON and dimmer switch 26 is selecting low-beam operation, actuation of flash-to-pass switch 30 will energize relay coil 32C, causing the high beam filaments 12H, 14H to illuminate for as long as switch 30 continues to be actuated.

The vehicle is considered to be running, or capable of motion, when the ignition switch is on and the parking brake is released, meaning the parking brake is not being applied, i.e. park brake switch 42 not actuated. Module 24 senses vehicle running by its connections to the ignition switch and to park brake switch 42. With anti-glare selector switch 44 in its first position cutting out the anti-glare feature, park brake switch 42 has continuity via conductors 51 and 49 to the park brake terminal of module 24, and module 24 operates in the usual way. Specifically, module 24 causes high-beam filaments 12H, 14H to be energized at daytime running intensity whenever both the ignition switch is on and the park brake is released. If either the parking brake is applied or the ignition switch is turned off, module 24 ceases to energize the high-beam headlight filaments, and daytime running illumination of the headlights ceases.

Daytime running operation ensues during vehicle running so long as headlight switch 20 remains in OFF position or PARK position P. Operating switch 20 to HEADLIGHT position H applies substantially full intensity voltage +V across high-beam filaments 12H, 14H whenever high-beam operation is selected by either dimmer switch 26 or flash-to-pass switch 30, thereby overriding the reduced voltage that would otherwise be applied by module 24. With switch 20 in HEADLIGHT position H, and neither switch 26 or 30 calling for high-beam operation, low-beam filaments 12L, 14L illuminate. Because of the circuit connection of module 24 to the low-beam filaments, the module may be effective to sense that the low-beam filaments are being energized, and as a result, discontinue daytime running energization of the high-beam filaments as long as the low-beam filaments continue to be energized.

When anti-glare selector switch 44 is operated to the second position for selecting the anti-glare feature, it allows coil 22C of anti-glare relay 22 to be energized under certain conditions. Switch 44 does so by providing circuit continuity of park brake switch 42 to coil 22C via conductors 51 and 47. Now when headlight switch 20 is in HEADLIGHT position H, park brake switch 42 becomes effective to cause module 24 to override headlight switch 20 whenever the parking brake is applied. As long as the parking brake is not applied while headlight switch 20 is in HEADLIGHT position H, coil 22C of anti-glare relay 22 cannot be energized through anti-glare selector switch 44. But when the parking brake is applied, the corresponding actuation of park brake switch 42 is effective, through switch 44, to cause coil 22C to be energized. Contact 22A operates from its normally closed state to open the feed from headlight switch terminal 20B3 to terminal 28A1 of relay 28. Hence, neither high- nor low-beam filaments can now be energized through relay 28. With switch 44 selecting the anti-glare feature, it disconnects park brake switch 42 from module 24 so that selection of the anti-glare feature will not automatically shut off headlight-module-controlled illumination when the feature is selected. The flash-to-pass feature however remains effective regardless of the position of selector switch 44.

When the anti-glare feature is switched in by switch 44, the anti-glare system is therefore effective to automatically cause headlights 12, 14 that are illuminating at full intensity on either high- or low-beam, to illuminate at reduced intensity when the vehicle park brake is applied. When a service vehicle, such as a truck, is stopped for a pick-up or delivery, its engine may be kept running and its headlights kept on. This may sometimes occur during non-daylight hours. It is believed useful, at least in some of those situations, to reduce the intensity of headlight illumination from full intensity to a lesser intensity, such as daytime running intensity for example. Reducing the headlight intensity can be effective to reduce the headlight glare that would be seen by the driver of an approaching vehicle. In the illustrated embodiment, the anti-glare feature can be implemented in a cost-effective manner because many circuit devices are already present in the vehicle. The implementation involves only certain wiring changes and the addition of relay 22 and switch 44.

In some vehicles, a signal source other than a park brake switch may be used to operate the anti-glare feature. Such a signal source may operate to a first position when a control of the vehicle indicates that the vehicle is parked, or at least not in motion, and to a second state when the control indicates the vehicle is capable of motion, although it need not necessarily be in motion. An example of a signal source that would be an alternative to a park brake switch is a transmission switch that operates to different positions depending on transmission gear selected by a transmission control.

Figure 2:
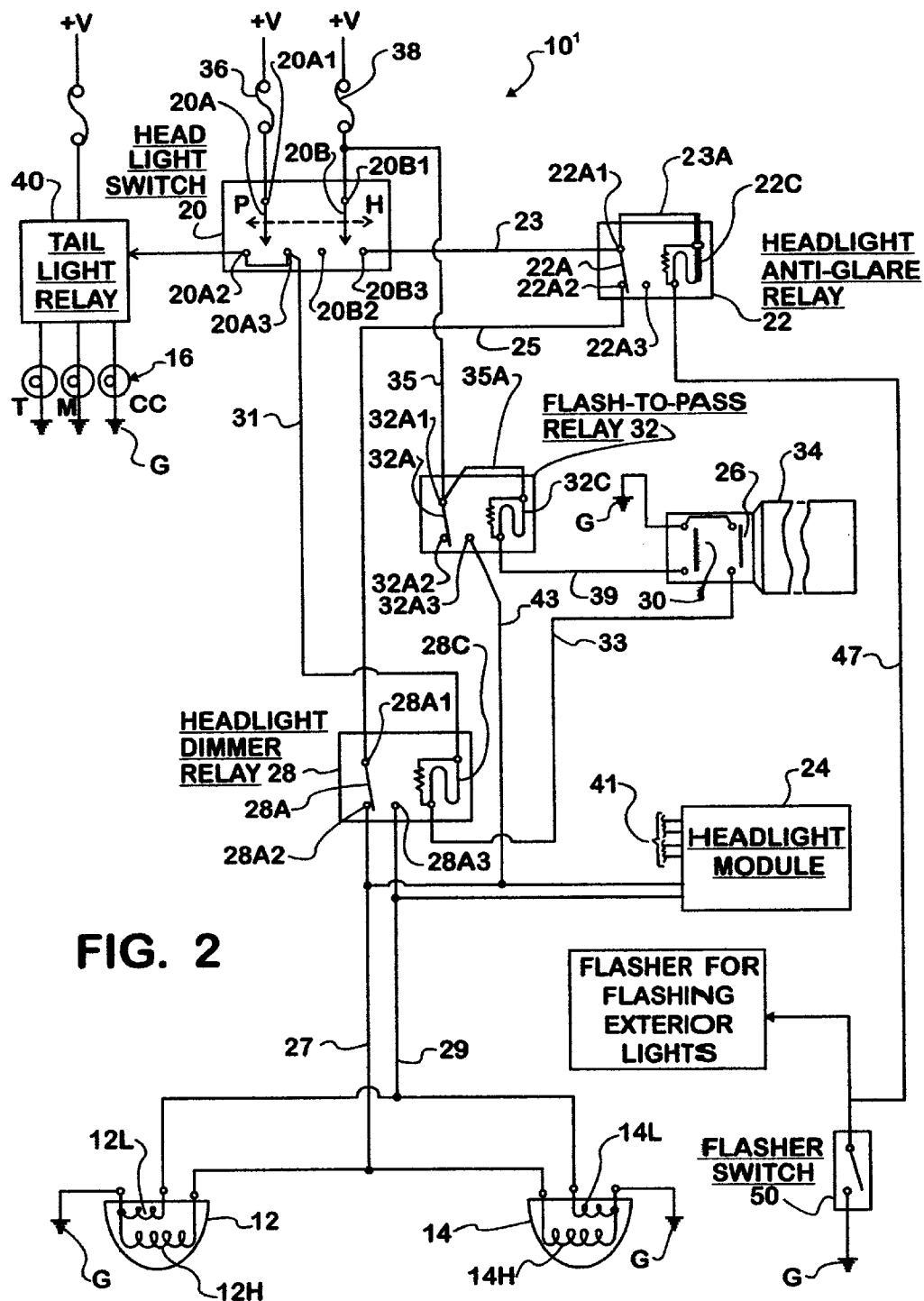
FIG. 2 is an electrical schematic diagram of a second embodiment of exterior lighting circuit of a motor vehicle that includes an anti-glare system for vehicle headlights according to principles of the present invention.

FIG. 2 shows a second embodiment of an exterior lighting circuit 10' of a motor vehicle comprising many of the same circuit elements as in FIG. 1. The same reference numerals are used to identify those elements. This embodiment is particularly suited for a school bus which has a flasher system that flashes certain exterior lights when the bus is stopped to allow ingress and egress of students. Circuit 10' differs from circuit 10 in that it utilizes a flasher switch 50 for operating relay coil 22C, and not park brake switch 42. It also lacks an anti-glare selector switch 44. Park brake switch 42 is still present, but it is connected directly to the appropriate terminal of module 24 for causing daytime running illumination of the headlights whenever headlight switch is not in HEADLIGHT position H, the parking brake is not applied, and the ignition switch is on. Operation of the headlight switch to HEADLIGHT position H will override daytime running illumination, causing the headlights to illuminate at full intensity, either high- or low-beam as determined by dimmer switch 26.

Flasher switch 50 is connected to coil 22C via conductor 47 to cause the coil to be energized whenever the switch is actuated. Switch 50 is associated with the flasher system typically provided by the manufacturer of the school bus body. The switch may be disposed for actuation in any appropriate manner. For example, the switch may be actuated automatically as the driver is opening the door of the bus after having stopped the bus, and remain actuated until the door once again closes. The switch is therefore effective, concurrent with the door being open, to cause exterior lights on the vehicle body to illuminate, typically by flashing, and the inclusion of the anti-glare feature in the vehicle automatically reduces the intensity of headlight illumination at the same time whenever the headlights also happen to be on, which would be expected during non-daylight operation. It is believed that this reduction in lighting intensity can beneficially reduce the headlight glare that would be seen by the driver of an approaching vehicle, thereby promoting better visibility for the driver of an oncoming vehicle during dusk and nighttime conditions. Reduced glare surrounding the scene present generally in front of the stopped vehicle may also beneficially improve the view of the driver of the stopped vehicle. Glare reduction may also be helpful during certain adverse weather conditions, both day and night, in heavy fog for example.

While a presently preferred embodiment of the invention has been illustrated and described, it should be appreciated that principles of the invention are applicable to all embodiments that fall within the scope of the claims that follow hereinafter.

What is claimed is:

1. A motor vehicle headlight circuit as set forth in claim 6 in which the signal switch comprises a park brake switch for signaling application of a vehicle parking brake when in the first position and non-application of the vehicle parking brake when in the second position.

2. A motor vehicle headlight circuit as set forth in claim 1 in which the reduced illumination intensity circuit comprises a headlight module to which the park brake witch is connected.

3. A motor vehicle headlight circuit that is energized from a voltage source and comprises:
   a) at least one headlight providing illumination of a field of view frontally of the vehicle;
   b) a headlight switch that is selectively operable to OFF and ON positions for selectively turning the at least one headlight off and on;
   c) a main headlight circuit controlled by the headlight switch for operating the at least one headlight substantially at nominally rated operating voltage when the headlight switch is operated to ON position to illuminate the field of view at nominal illumination intensity;
   d) a reduced illumination intensity circuit for operating the at least one headlight at less than nominally rated operating voltage to illuminate the field of view at less than nominal illumination intensity when the headlight switch is in OFF position; and
   e) a signal source that is selectively operable to give a first signal for causing interruption of the main headlight circuit and the at least one headlight to operate at less than nominally rated operating voltage, and to give a second signal for causing no interruption of the main headlight circuit so that operation of the headlight switch to ON position is effective to operate the at least one headlight at nominally rated operating voltage;
   in which the signal source comprises a signal switch that is selectively operable to a first position for giving the first signal and to a second position for giving the second signal;
   the signal switch comprises a park brake switch for signaling application of a vehicle parking brake when in the first position and non-application of the vehicle parking brake when in the second position;
   the reduced illumination intensity circuit comprises a daytime running light circuit to which the park brake switch is connected; and
   including a selector switch through which the park brake switch is connected to the daytime running light circuit, wherein the selector switch is operable to a first position that provides continuity of the park brake switch to the daytime running light circuit and a second position that interrupts continuity of the park brake switch to the daytime running light circuit, and wherein the selector switch is effective, when in its second position, to prevent the park brake switch from interrupting the main headlight circuit.

4. A motor vehicle lighting system that includes an exterior light circuit and a headlight circuit that is energized from a voltage source and comprises:
   a) at least one headlight providing illumination of a field of view frontally of the vehicle;
   b) a headlight switch that is selectively operable to OFF and ON positions for selectively turning the at least one headlight off and on;
   c) a main headlight circuit controlled by the headlight switch for operating the at least one headlight substantially at nominally rated operating voltage when the headlight switch is operated to ON position to illuminate the field of view at nominal illumination intensity;
   d) a reduced illumination intensity circuit for operating the at least one headlight at less than nominally rated operating voltage to illuminate the field of view at less than nominal illumination intensity when the headlight switch is in OFF position;
   e) a signal source that is selectively operable to give a first signal for causing interruption of the main headlight circuit and the at least one headlight to operate at less than nominally rated operating voltage, and to give a second signal for causing no interruption of the main headlight circuit so that operation of the headlight switch to ON position is effective to operate the at least one headlight at nominally rated operating voltage; and
   f) at least one motor vehicle exterior light;
   in which the signal source comprises a signal switch that is selectively operable to a first position for giving the first signal and to a second position for giving the second signal; and
   the signal switch comprises a switch for also causing flashing of the at least one motor vehicle exterior light when in the first position.

5. A motor vehicle comprising:
   a) a voltage source;
   b) at least one headlight providing illumination of a field of view frontally of the vehicle;
   c) a headlight control that is selectively operable to OFF and ON positions for selectively turning the at least one headlight off and on;
   d) a main headlight circuit controlled by the headlight switch for causing substantially full voltage of the voltage source to be applied to the at least one headlight when the headlight control is operated to ON position to illuminate the field of view at a relatively full illumination intensity;
   e) a reduced illumination intensity circuit for causing substantially less than full voltage of the voltage source to be applied to the at least one headlight so that the field of view is illuminated at substantially less than relatively full illumination intensity when the headlight switch is in OFF position; and
   f) a signal source that is selectively operable to give a first signal that causes interruption of the main headlight circuit and substantially less than full voltage of the voltage source to be applied to the at least one headlight, and to give a second signal that causes no interruption of the main headlight circuit so that operation of the headlight switch to ON position is effective to cause substantially full voltage of the voltage source to be applied to the at least one headlight;
   in which the signal switch comprises a park brake switch that is selectively operable to a first position for giving a first signal to indicate application of a parking brake of the vehicle and to a second position for giving a second signal to indicate non-application of the parking brake;
   the reduced illumination intensity circuit comprises a daytime running light circuit to which the park brake switch is connected; and
   including a selector switch through which the park brake switch is connected to the daytime running light circuit, wherein the selector switch is operable to a first position that provides continuity of the park brake switch to the daytime running light circuit and a second position that interrupts continuity of the park brake switch to the daytime running light circuit, and wherein the selector switch is effective, when in its second position, to prevent the park brake switch from interrupting the headlight circuit.

6. A motor vehicle comprising:
a) a voltage source;
b) at least one headlight providing illumination of a field of view frontally of the vehicle;
c) a headlight control that is selectively operable to OFF and ON positions for selectively turning the at least one headlight off and on;
d) a main headlight circuit controlled by the headlight switch for causing substantially full voltage of the voltage source to be applied to the at least one headlight when the headlight control is operated to ON position to illuminate the field of view at a relatively full illumination intensity;
e) a reduced illumination intensity circuit for causing substantially less than full voltage of the voltage source to be applied to the at least one headlight so that the field of view is illuminated at substantially less than relatively full illumination intensity when the headlight switch is in OFF position; and
f) a signal source that is selectively operable to give a first signal that causes interruption of the main headlight circuit and substantially less than full voltage of the voltage source to be applied to the at least one headlight, and to give a second signal that causes no interruption of the main headlight circuit so that operation of the headlight switch to ON position is effective to cause substantially full voltage of the voltage source to be applied to the at least one headlight;
in which the signal source comprises a signal switch that is selectively operable to a first position for giving the first signal and to a second position for giving the second signal; and
in which the vehicle comprises at least one exterior light, and the signal switch is effective to cause flashing of the at least one exterior light when operated to give the first signal.

7. A motor vehicle as set forth in claim 6 in which the vehicle comprises a door that opens and closes to allow passenger ingress and egress, and the signal switch is associated with operation of the door to give the first signal when the door is open and the second signal when the door is closed.

8. A motor vehicle comprising:
a) a voltage source;
b) at least one headlight providing illumination of a field of view frontally of the vehicle;
c) a headlight control that is selectively operable to OFF and ON positions for selectively turning the at least one headlight off and on;
d) a main headlight circuit controlled by the headlight switch for causing substantially full voltage of the voltage source to be applied to the at least one headlight when the headlight control is operated to ON position to illuminate the field of view at a relatively full illumination intensity;
e) a reduced illumination intensity circuit for causing substantially less than full voltage of the voltage source to be applied to the at least one headlight so that the field of view is illuminated at substantially less than relatively full illumination intensity when the headlight switch is in OFF position; and
f) a signal source that is selectively operable to give a first signal that causes interruption of the main headlight circuit and substantially less than full voltage of the voltage source to be applied to the at least one headlight, and to give a second signal that causes no interruption of the main headlight circuit so that operation of the headlight switch to ON position is effective to cause substantially full voltage of the voltage source to be applied to the at least one headlight;
in which the vehicle comprises a door that opens and closes to allow passenger ingress and egress, and the signal source is associated with operation of the door to give the first signal when the door is open and the second signal when the door is closed.

9. A motor vehicle comprising:
a) a voltage source;
b) at least one headlight providing illumination of a field of view frontally of the vehicle;
c) a headlight control that is selectively operable to OFF and ON positions for selectively turning the at least one headlight off and on;
d) a main headlight circuit controlled by the headlight switch for causing substantially full voltage of the voltage source to be applied to the at least one headlight when the headlight control is operated to ON position to illuminate the field of view at a relatively full illumination intensity;
e) a reduced illumination intensity circuit for causing substantially less than full voltage of the voltage source to be applied to the at least one headlight so that the field of view is illuminated at substantially less than relatively full illumination intensity when the headlight switch is in OFF position; and
f) a signal source that is selectively operable to give a first signal that causes interruption of the main headlight circuit and substantially less than full voltage of the voltage source to be applied to the at least one headlight, and to give a second signal that causes no interruption of the main headlight circuit so that operation of the headlight switch to ON position is effective to cause substantially full voltage of the voltage source to be applied to the at least one headlight;
in which the headlight control comprises a headlight switch, and further including a controlled conduction device having a controlled conduction path controlled by a controlling element is associated with the headlight control, the at least one headlight, and the signal source such that the controlled conduction path is connected in circuit between the headlight control and the at least one headlight, and the controlling element is connected between the headlight control and the signal source; and
in which the signal source comprises a signal switch, the controlled conduction device comprises a relay, the controlled conduction path comprises a normally closed contact of the relay, and the controlling element comprises a coil that when energized opens the normally closed contact.

10. A motor vehicle as set forth in claim 9 in which the signal source gives the first signal when a control of the vehicle indicates that the vehicle is not in motion and the second signal when the control indicates the vehicle is capable of motion.

11. A motor vehicle headlight circuit that is energized from a voltage source and comprises:
   a) at least one headlight providing illumination of a field of view frontally of the vehicle;
   b) a headlight switch that is selectively operable to OFF and ON positions for selectively turning the at least one headlight off and on;
   c) a main headlight circuit controlled by the headlight switch for operating the at least one headlight substantially at nominally rated operating voltage when the headlight switch is operated to ON position to illuminate the field of view at nominal illumination intensity;
   d) a reduced illumination intensity circuit for operating the at least one headlight at less than nominally rated operating voltage to illuminate the field of view at less than nominal illumination intensity when the headlight switch is in OFF position; and
   e) a signal source that is selectively operable to give a first signal for causing interruption of the main headlight circuit and the reduced illumination intensity circuit to operate the at least one headlight at less than nominally rated operating voltage, and to give a second signal for causing no interruption of the main headlight circuit so that operation of the headlight switch to ON position is effective to operate the at least one headlight at nominally rated operating voltage;
      in which the signal source indicates the status of a control of the vehicle that is selectively operable to respectively resist and not resist vehicle motion by giving the first signal when the control is operated to resist vehicle motion and by giving the second signal when the control is operated to not resist vehicle motion.

12. A motor vehicle headlight circuit as set forth in claim 11 in which the signal source comprises a signal switch that is selectively operable to a first position for giving the first signal when the control is operated to resist vehicle motion and to a second position for giving the second signal when the control is operated to not resist vehicle motion.

13. A motor vehicle headlight circuit as set forth in claim 12 in which the signal switch comprises a park brake switch for signaling application of a parking brake of the vehicle when in the first position and non-application of the parking brake when in the second position.

14. A motor vehicle headlight circuit as set forth in claim 13 in which the reduced illumination intensity circuit comprises a daytime running light circuit to which the park brake switch is connected.

15. A motor vehicle headlight circuit as set forth in claim 12 in which the reduced illumination intensity circuit comprises a daytime running light circuit to which the signal switch is connected, and further including a selector switch through which the signal switch is connected to the daytime running light circuit, wherein the selector switch is operable to a first position that provides continuity of the signal switch to the daytime running light circuit and a second position that interrupts continuity of the signal switch to the daytime running light circuit, and wherein the selector switch is effective, when in its second position, to prevent the signal switch from interrupting the main headlight circuit.

16. A motor vehicle comprising:
   a) a voltage source;
   b) at least one headlight providing illumination of a field of view frontally of the vehicle;
   c) a headlight control that is selectively operable to OFF and ON positions for selectively turning the at least one headlight off and on;
   d) a main headlight circuit controlled by the headlight control for causing substantially full voltage of the voltage source to be applied to the at least one headlight when the headlight control is operated to ON position to illuminate the field of view at a relatively full illumination intensity;
   e) a control that is selectively operable to respectively resist and not resist vehicle motion;
   f) a signal source that, when the control is resisting vehicle motion and the headlight control is in ON position, gives a signal for overriding the main headlight circuit by causing substantially less than full voltage of the voltage source to be applied to the at least one headlight so that the field of view is illuminated at substantially less than relatively full illumination intensity, and that, when the control is not resisting vehicle motion and the headlight control is in ON position, does not give the signal and hence does not override the main headlight circuit.

17. A motor vehicle as set forth in claim 16 in which the signal source comprises a signal switch that is selectively operable to a first position for giving the signal when the control is operated to resist vehicle motion and to a second position for that does not give the signal when the control is operated to not resist vehicle motion.

18. A motor vehicle as set forth in claim 17 in which the vehicle control comprises a parking brake that is selectively operable to respectively apply and release a vehicle parking brake, and the signal switch comprises a park brake switch for signaling application of a parking brake of the vehicle when in the first position and release of the parking brake when in the second position.

19. A motor vehicle as set forth in claim 17 in which the reduced illumination intensity circuit comprises a daytime running light circuit to which the park brake switch is connected.

20. A motor vehicle as set forth in claim 17 in which the reduced illumination intensity circuit comprises a daytime running light circuit to which the signal switch is connected, and further including a selector switch through which the signal switch is connected to the daytime running light circuit, wherein the selector switch is operable to a first position that provides continuity of the signal switch to the daytime running light circuit and a second position that interrupts continuity of the signal switch to the daytime running light circuit, and wherein the selector switch is effective, when in its second position, to prevent the signal switch from overriding the main headlight circuit.

21. A motor vehicle comprising:
   a) a voltage source;
   b) at least one headlight providing illumination of a field of view frontally of the vehicle;
   c) a headlight control that is selectively operable to OFF and ON positions for selectively turning the at least one headlight off and on;
   d) a main headlight circuit controlled by the headlight control for causing substantially full voltage of the voltage source to be applied to the at least one headlight when the headlight control is operated to ON position to illuminate the field of view at a relatively full illumination intensity;
   e) exterior lights on the exterior of the vehicle that are visible to a driver of an on-coming vehicle;
   f) a switch that is selectively operable to respectively flash and not flash the exterior lights, and that when operated to flash the exterior lights, overrides the main headlight circuit to cause substantially less than full voltage of the voltage source to be applied to the at least one headlight so that the field of view is illuminated at substantially less than relatively full illumination intensity while the exterior lights are flashing, and that, when operated to not flash the exterior lights while the headlight control is in ON position, does not override the main headlight circuit.

22. A motor vehicle as set forth in claim 21 in which the vehicle comprises a school bus for transporting students.

23. A motor vehicle as set forth in claim 6 in which the vehicle comprises a school bus for transporting students.

24. A motor vehicle as set forth in claim 8 in which the vehicle comprises a school bus for transporting students.

* * * * *